Patented Feb. 6, 1934

1,946,398

UNITED STATES PATENT OFFICE 1,946,398

METHOD OF ROASTING COFFEE

Joseph F. Gilbreath, Louisville, Ky.

No Drawing. Application April 17, 1931
Serial No. 531,014

4 Claims. (Cl. 99—11)

This invention relates to the roasting of coffee and has for its primary object the production of roasted coffee with an improved aroma and flavor.

Another object of the invention is to provide a method of roasting coffee by which some of the moisture lost by the bean in roasting, is restored and also the life or freshness of the coffee is extended indefinitely, or in other words, the coffee roasted according to the present method will keep over a long period without becoming stale or rancid.

It is of course well known that in the regular process of roasting coffee a certain amount of water is added to the hot roasted beans in order that the same may absorb enough moisture to prevent its becoming brittle so that the beans may be handled without breaking up.

In following the present method or process there is added to the water, which is added to the coffee beans, a quantity of organic acid such for example as acetic acid, or citric acid. Acetic acid is preferred and this is taken in the proportions of approximately one-quarter of the amount of water which is added to the beans, or in proportion as needed for the particular grade of coffee being roasted.

The time of applying the mixture of acid and water to the roasting beans, is just before drawing the freshly roasted coffee from the oven, and while it is still hot.

As previously explained, the acid and water mixture, when added to the hot freshly roasted coffee, restores some of the moisture and acids lost during the process of roasting. The decided advantage of this method over any other method at present known, is proven by a decided zest and improved flavor added to the bean, and also that the life or freshness of the roasted coffee is materially extended. In fact, it is yet to be proven that coffee roasted by this process will ever become rancid or stale.

While the statement has been made that the acid is taken in approximately the proportion of one part to three parts of water or, in other words, one-quarter of the amount of moisture used is acid, it is to be understood that the invention is not to be limited to these proportions for the reason that variations must be made to suit the particular grade of coffee being roasted. All coffees do not contain the same amount of acidity, cheaper grades containing more acid than the better or higher grades, consequently the amount of acid used would have to vary in proportion to the needs of the particular roaster.

Having thus described my invention, what is claimed is:—

1. The herein described method of roasting coffee, which consists in adding a mixture of water and an organic acid to the freshly roasted coffee before drawing the same from the oven and while it is still hot.

2. The herein described method of roasting coffee, which consists in adding a mixture of an organic acid and water to the freshly roasted coffee before drawing the same from the roasting oven and while the same is hot, the proportion of acid employed corresponding to the percentage proportion of acid in the particular grade of coffee being roasted.

3. The improved method of roasting coffee which consists in adding a mixture of acetic acid and water thereto before drawing the same from the oven and while it is still hot.

4. The improved method of roasting coffee which consists in adding a mixture of water and citric acid to the same before drawing it from the roasting oven and while it is still hot.

JOSEPH F. GILBREATH.